Nov. 7, 1967

R. R. WHEELER 3,351,375

GLARE SHIELD

Filed April 26, 1965

Ralph R. Wheeler
INVENTOR.

BY James Harrison Bowen
ATTORNEY

United States Patent Office 3,351,375
Patented Nov. 7, 1967

3,351,375
GLARE SHIELD
Ralph R. Wheeler, 4919 Gulfport Blvd.,
Gulfport, Fla. 33737
Filed Apr. 26, 1965, Ser. No. 450,943
1 Claim. (Cl. 296—97)

The present invention relates to glare shields for use in combination with visors of motor vehicles, and in particular a shield mounted by a spring clip or clips on an edge of a visor for suspending a shield from the extended edge of the visor.

The purpose of this invention is to provide a glare shield for use in motor vehicles in which bright rays of light, such as rays from the sun or of approaching vehicles are absorbed by a sheet of woven material or fabric.

Various types of glare shields have been provided for use in combination with visors of motor vehicles. However, such shields are nested against the ceiling or under surface of the top of a vehicle when not in use and, consequently, it is desirable to make the shield of light weight and, at the same time, of sufficient thickness to absorb glare rays.

The object of this invention is, therefore, to provide a glare shield designed for use in combination of visors of motor vehicles in which the shield absorbs glare rays.

Another object of the invention is to provide a glare shield for motor vehicles that is designed to be readily attached to a visor of a vehicle without mechanical fastening means.

A further object of the invention is to provide a glare shield that is readily adjustable to compensate for visors of different sizes.

A still further object of the invention is to provide a glare shield for use in combination with visors of motor vehicles in which the shield is of simple and economical construction.

Other and further objects and advantages of the present invention will be apparent from the following detailed description, drawing and claim, the scope of the invention not being limited to the illustration of the drawing as the drawing is only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claim.

With these and other objects and advantages in view the invention embodies a sheet of woven material of sufficient thickness in the upper portion to absorb rays of light, and a pair of spring clips designed to slip over the extended edge of a motor vehicle visor an dalso having jaws for mounting the shield on the rim of a visor, wherein the shield may be readily attached to, or removed from the visor.

Other features and advantages of the invention will appear from the following description taken in connection with the drawing, wherein.

Figure 1:
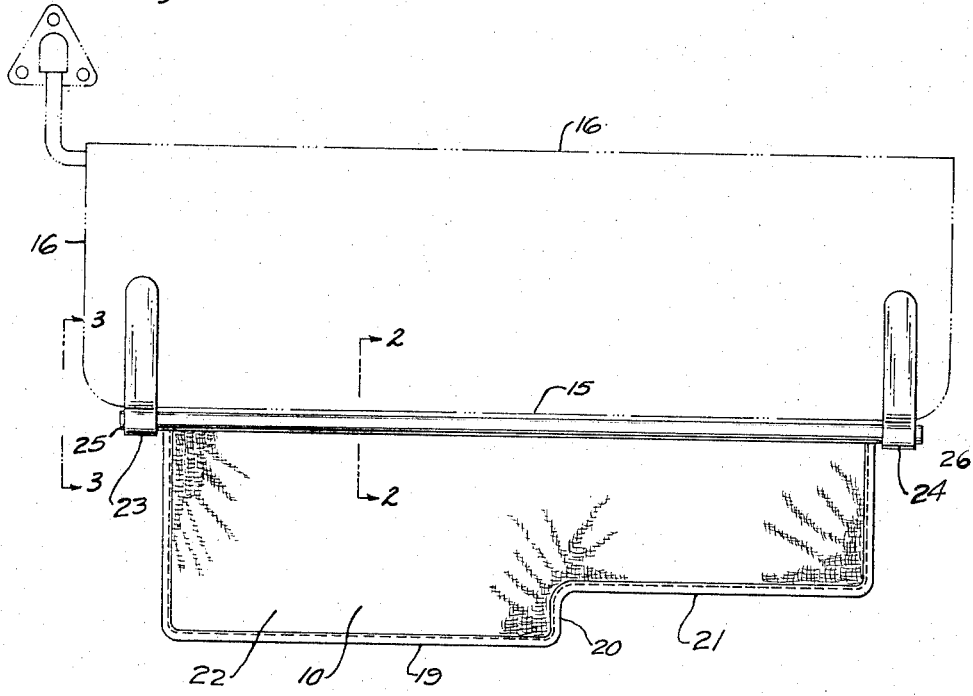
FIGURE 1 is a plan view of the improved glare shield showing the shield attached by spring clips to a visor of a motor vehicle.

While one embodiment of the invention is illustrated in the above-referred-to drawing, it is to be understood that it is merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the pirmary field of utility of the invention it remains obvious that it may be employed in any other capacity wherein it may be found applicable.

In the accompanyning drawing, and in the following specification, the same reference characters are used to designate the same parts and elements throughout and in which the numeral 10 indicates a glare shield of woven material of fabric, numerals 11 and 12 indicating gripping jaws of a tubular spring clip, and numerals 13 and 14 gripping jaws at the back of a spring clip for retaining the clip in operative position on the rim 15 of a visor 16.

Figure 2:
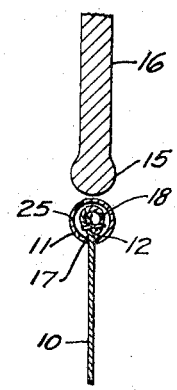
FIGURE 2 is a cross section through the glare shield and adjacent portion of a visor showing the relative positions of the parts and with the parts shown on an enlarged scale.

In the design shown in FIGURE 2 a glare shield 10 is shown in operative position wherein the jaws 11 and 12 are separated by a slot 17 in which the shield is positioned and the shield is retained in position on the visor by a rolled edge 18 of the shield, as shown in FIGURE 2.

The lower edge 19 of the shield 10 is provided with an offset section 20 which provides an opening 21 for vision in one side of the shield and the offset section also provides an overhanging lip 22 which facilitates intercepting rays of light on the left hand side of the vehicle.

Figure 3:
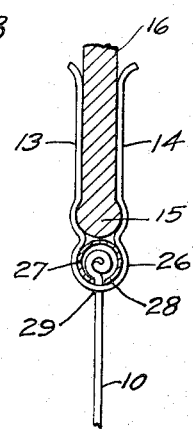
FIGURE 3 is an end elevational view of the glare shield and mounting spring clips also with the parts shown on an enlarged scale and with the end portion of the shield shown in elevation.

In the design shown in FIGURE 3 spring clips 23 and 24 are positioned over extended ends 25 and 26 of the split tube 27 on which the visor 16 is mounted. The tube 27 is provided with a rolled edge 28 similar to the rolled edge 18 of the shield 10, as shown in FIGURE 2. The rolled edge 27 is also provided with a slot 29 which is similar to the slots 17 of the clips.

In use the ends of the shield 10 are inserted in the clips 23 and 24 and the gripping jaws 13 and 14 are slid over portions of the visor whereby the shield may hang vertically or may extend outwardly, as may be desired. The shield may be removed and placed in a suitable compartment when use thereof is not desired.

It is preferred to make the shield 10 of woven material, such as strands of plastic whereby the strands intercept glare rays and permit normal vision.

From the foregoing description, it is thought to be obvious that a glare shield constructed in accordance with this invention is particularly well adapted for use, by reason of the convenience and facility with which it may be assembled and operated, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

What is claimed is:

In a glare shield, the combination which comprises,
(a) a panel of woven translucent material, substantially rectangular-shaped in elevation and having an open area in the lower right and side for elevating the line of vision above a similar portion of said panel on the left hand side of the glare shield, for diffusing rays of light from headlights of an approaching vehicle,
(b) a transversely positioned split tubular rod extended across the upper edge of said panel, and in which a portion of said panel is frictionally held,
(c) a pair of spring clips each including a lower loop portion frictionally engaging an end of said rod for retaining said glare shield in adjusted position,
(d) and said spring clips further including gripping jaws adapted to frictionally engage a vehicle sun visor.

References Cited

UNITED STATES PATENTS

| | | | |
|---|---|---|---|
| 1,530,784 | 3/1925 | Midgley | 296—97 |
| 1,928,249 | 9/1933 | Eisenzopf et al. | 296—97 |
| 2,231,641 | 2/1941 | Schwab | 296—97 |
| 2,458,125 | 1/1949 | Winkler | 296—97 |
| 2,528,038 | 10/1950 | Crise | 296—97 |
| 2,622,922 | 12/1952 | Schroeder | 296—97 |

FOREIGN PATENTS 3,345/26  8/1927  Australia.

BENJAMIN HERSH, *Primary Examiner.*

J. A. PEKAR, *Assistant Examiner.*